United States Patent
Liang et al.

(10) Patent No.: US 7,072,095 B2
(45) Date of Patent: Jul. 4, 2006

(54) ELECTROPHORETIC DISPLAY AND NOVEL PROCESS FOR ITS MANUFACTURE

(75) Inventors: Rong-Chang Liang, Cupertino, CA (US); Jack Hou, Fremont, CA (US); Yajuan Chen, San Jose, CA (US); Scott C-J Tseng, San Jose, CA (US); Jerry Chung, Mountain View, CA (US)

(73) Assignee: SiPix Imaging, Inc., Fremont, CA (US)

( * ) Notice: Subject to any disclaimer, the term of this patent is extended or adjusted under 35 U.S.C. 154(b) by 0 days.

(21) Appl. No.: 10/696,805

(22) Filed: Oct. 29, 2003

(65) Prior Publication Data

US 2004/0169912 A1   Sep. 2, 2004

Related U.S. Application Data

(60) Provisional application No. 60/422,940, filed on Oct. 31, 2002.

(51) Int. Cl.
*G02B 26/00* (2006.01)
*G09G 3/34* (2006.01)
*G03G 17/04* (2006.01)

(52) U.S. Cl. .................... 359/296; 359/290; 345/107; 430/32

(58) Field of Classification Search ............... 359/296, 359/290; 345/107; 430/32–38, 319
See application file for complete search history.

(56) References Cited

U.S. PATENT DOCUMENTS

| | | | |
|---|---|---|---|
| 3,612,758 A | 10/1971 | Evans et al. ............... 348/803 |
| 3,668,106 A | 6/1972 | Ota ........................... 358/305 |
| 4,071,430 A | 1/1978 | Liebert ...................... 359/241 |
| 4,093,534 A | 6/1978 | Carter et al. ............... 359/296 |
| 4,285,801 A | 8/1981 | Chiang ...................... 252/570 |
| 4,680,103 A | 7/1987 | Solomon et al. ........... 359/296 |
| 5,380,362 A | 1/1995 | Schubert .................... 106/493 |
| 5,403,518 A | 4/1995 | Schubert .................... 252/572 |
| 5,573,711 A | 11/1996 | Hou et al. .................. 252/572 |
| 5,745,094 A * | 4/1998 | Gordon et al. ............. 345/107 |
| 5,767,826 A * | 6/1998 | Sheridon et al. ............. 345/84 |
| 5,914,806 A | 6/1999 | Gordon, II et al. ........ 359/296 |
| 5,930,026 A | 7/1999 | Jacobson et al. .......... 359/296 |
| 5,961,804 A | 10/1999 | Jacobson et al. .......... 204/606 |
| 6,017,584 A | 1/2000 | Albert et al. ............ 427/213.3 |
| 6,577,433 B1 * | 6/2003 | Lin et al. ................... 359/296 |
| 6,672,921 B1 | 1/2004 | Liang et al. ................. 445/24 |
| 6,727,873 B1 * | 4/2004 | Gordon et al. ............... 345/88 |
| 6,788,449 B1 * | 9/2004 | Liang et al. ............... 359/296 |
| 6,788,452 B1 * | 9/2004 | Liang et al. ............... 359/296 |
| 6,795,138 B1 | 9/2004 | Liang et al. ............... 349/187 |

(Continued)

FOREIGN PATENT DOCUMENTS

JP   2003 131270   9/2003

(Continued)

OTHER PUBLICATIONS

U.S. Appl. No. 09/518,488, filed Mar. 2000, Liang et al.

(Continued)

*Primary Examiner*—Ricky Mack
*Assistant Examiner*—M. Hasan
(74) *Attorney, Agent, or Firm*—Howrey LLP

(57) ABSTRACT

This invention relates to an electrophoretic display with improved contrast ratio, switching performance, reflectivity at the Dmin state and structural integrity, and methods for its manufacture.

46 Claims, 6 Drawing Sheets

U.S. PATENT DOCUMENTS

| | | | |
|---|---|---|---|
| 6,831,770 B1* | 12/2004 | Liang et al. | 359/296 |
| 6,842,279 B1* | 1/2005 | Amundson | 359/296 |
| 6,859,302 B1* | 2/2005 | Liang et al. | 359/296 |
| 6,870,662 B1* | 3/2005 | Tseng et al. | 359/296 |
| 6,882,463 B1* | 4/2005 | Motoi et al. | 359/296 |
| 6,927,892 B1* | 8/2005 | Ho et al. | 359/296 |
| 2002/0033793 A1 | 3/2002 | Machida et al. | 345/107 |
| 2002/0135861 A1 | 9/2002 | Nakao et al. | 359/296 |
| 2002/0182544 A1* | 12/2002 | Chan-Park et al. | 430/311 |
| 2002/0188053 A1* | 12/2002 | Zang et al. | 524/474 |
| 2003/0174385 A1 | 9/2003 | Liang et al. | 359/296 |
| 2003/0179437 A1* | 9/2003 | Liang et al. | 359/296 |

FOREIGN PATENT DOCUMENTS

| | | |
|---|---|---|
| WO | WO 02/57843 | 7/2002 |

OTHER PUBLICATIONS

U.S. Appl. No. 60/315,647, filed Aug. 2001, Liang et al.
U.S. Appl. No. 60/345,934, filed Jan. 2002, Chen et al.
U.S. Appl. No. 60/345,936, filed Jan. 2002, Chen et al.
U.S. Appl. No. 60/356,226, filed Feb. 2002, Hsu et al.
U.S. Appl. No. 60/367,325, filed Mar. 2002, Ho et al.
U.S. Appl. No. 60/375,299, filed Apr. 2002, Chung et al.
U.S. Appl. No. 60/396,680, filed Jul. 2002, Wu et al.
U.S. Appl. No. 60/400,021, filed Jul. 2002, Yu et al.
U.S. Appl. No. 60/408,256, filed Sep. 2002, Pereira et al.
U.S. Appl. No. 60/413,225, filed Sep. 2002, Chen et al.
U.S. Appl. No. 60/618,078, filed Oct. 2002, Yu et al.
Int'l Search Report PCT/US03/34562, Jun. 2004, WIPO.
Allen, K. (Oct. 2003) Electrophoretics Fulfilled. *Emerging Displays Review: Emerging Display Technologies, Monthly Report Oct. 2003* 9-14.
Chen, S.M. (Jul. 2003) The Applications for the Revolutionary Paper Technology. *OPTO News & Letters,* 102, 37-41. (in Chinese, English abstract attached, full translation available upon request).
Chen, S.M. (May 2003) The New Applications and the Dynamics of Companies. *TRI.* 1-10. (In Chinese, English abstract attached, full translation available upon request).
Dalisa, A.L., (1977) Electrophoretic Display Technology. *IEEE Trans. Electron Devices,* ED-24, 827-834.
Lee, H., & Liang, R.C. (Jun. 2003) SiPix Microcup(R) Electronic Paper—An Introduction. *Advanced Display,* 3, 4-9 (in Chinese, English abstract attached, full translation available upon request).
Liang, R.C. (Feb. 2003) *Microcup(R) Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.
Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest,* 20.1.
Liang, R.C., Hou, J., Zang, H.M., Chung, J., & Tseng, S. (2003) Microcup(R) displays : Electronic Paper by Roll-to-Roll Manufacturing Processes. *Journal of the SID,* 11(4), 621-628.
Liang, R.C., Hou, J., Zang, H.M., & Chung, J. (Feb. 2003) *Passive Matrix Microcup(R) Electrophoretic Displays.* Paper presented at the IDMC, Taipei, Taiwan.
Liang, R.C., Hou, J., & Zang, H.M. (Dec. 2002) Microcup Electrophoretic Displays by Roll-to-Roll Manufacturing Processes. *IDW,* EP2-2, 1337-1340.
Liang, R.C., & Tseng, S. (Feb. 2003). *Microcup(R) LCD, An New Type of Dispersed LCD by A Roll-to-Roll Manufacturing Process.* Paper presented at the IDMC, Taipei, Taiwan.
Hopper, M.A. & Novotny, V. (1979). IEEE Trans. Electr. Dev., 26 (8), 1148-1152.
Murau, P. et al. (1978) The Understanding and Elimination of Some Suspension Instabilities in an Electrophoretic Display. *J. Appl. Phys.,* 49(9), 4820-4829.
Nikkei Microdevices, (Dec. 2002) Newly-Developed Color Electronic Paper Promises—Unbeatable Production Efficiency. *Nikkei Microdevices,* 3. (in Japanese, with English translation).
Zang, H.M. (Oct. 2003). *Microcup (R) Electronic Paper by Roll-to-Roll Manufacturing Processes.* Presentation conducted at the Advisory Board Meeting, Bowling Green State University, Ohio, USA.
Zang, H.M., & Liang, R.C. (2003) Microcup Electronic Paper by Roll-to-Roll Manufacturing Processes, *The Spectrum,* 16(2), 16-21.

* cited by examiner

ELECTROPHORETIC DISPLAY AND NOVEL PROCESS FOR ITS MANUFACTURE

RELATED APPLICATION

This application claims the priority under 35 USC 119(e) of U.S. Provisional Applications No. 60/422,940, filed Oct. 31, 2002. The whole content of the priority application is incorporated into this application by reference.

BACKGROUND OF THE INVENTION a) Field of the Invention

This application relates to an electrophoretic display with improved contrast ratio, switching performance, reflectivity at the Dmin state and structural integrity, and methods for its manufacture.

b) Description of Related Art

The electrophoretic display is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells (see M. A. Hopper and V. Novotny, IEEE Trans. Electr. Dev., 26(8):1148–1152(1979)). However, in the case of partition-type electrophoretic displays, difficulties were encountered in the formation of the partitions and the process of enclosing the suspension. Furthermore, it was also difficult to keep suspensions of different colors separate from each other in the partition-type electrophoretic display.

Another type of EPD (see U.S. Pat. No. 3,612,758) has electrophoretic cells that are formed from parallel line reservoirs (the channel or groove type). The filling and sealing of electrophoretic fluid in the channels are accomplished by a batch-wise process. In addition, the problem of undesirable particle movement or sedimentation, particularly in the longitude direction, remains an issue.

Subsequently, attempts were made to enclose the suspension in microcapsules. U.S. Pat. Nos. 5,961,804, 5,930,026 and 6,017,584 describe microencapsulated electrophoretic displays. The reference display has a substantially two dimensional arrangement of microcapsules each having therein an electrophoretic composition of a dielectric solvent and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" onto or coated on a transparent conductor film. The microcapsules may also be immobilized within a transparent matrix or binder that is itself sandwiched between the two electrodes.

The electrophoretic displays prepared by these processes, in particular, the microencapsulation process as disclosed in U.S. Pat. Nos. 5,961,804, 5,930,026 and 6,017,584, have many shortcomings. For example, the electrophoretic display manufactured by the microencapsulation process suffers from sensitivity to environmental changes (in particular, sensitivity to moisture and temperature) due to the wall chemistry of the microcapsules. Secondly, the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the electrophoretic display of this type has poor resolution and addressability for color applications.

An improved EPD technology was recently disclosed in co-pending applications, U.S. Ser. No. 09/518,488 filed on Mar. 3, 2000 (corresponding to WO01/67170), U.S. Ser. No. 09/606,654 filed on Jun. 28, 2000 (corresponding to WO02/01280) and U.S. Ser. No. 09/784,972 filed on Feb. 15, 2001 (corresponding to WO02/65215), all of which are incorporated herein by reference in their entirety. The improved EPD comprises isolated cells formed from microcups of well-defined shape, size and aspect ratio and filled with charged pigment particles or pigment-containing microparticles dispersed in a dielectric solvent or solvent mixture, preferably a fluorinated solvent or solvent mixture. The filled cells are individually sealed with a polymeric sealing layer, preferably formed from a composition comprising a material selected from the group consisting of thermoplastics, thermoplastic elastomers, thermosets and precursors thereof.

The microcup structure enables a format flexible and efficient roll-to-roll continuous manufacturing process for the preparation of EPDs. The displays can be prepared on a continuous web of a conductor film such as ITO/PET by, for example, (1) coating a radiation curable composition onto the ITO/PET film, (2) forming the microcup structure by a microembossing or photolithographic method, (3) filling an electrophoretic fluid into the microcups and sealing the filled microcups, (4) laminating the sealed microcups with the other conductor film and (5) slicing and cutting the display to a desirable size or format for assembling.

One advantage of this type of EPD is that the microcup wall is in fact a built-in spacer to keep the top and bottom substrates apart at a fixed distance. The mechanical properties and structural integrity of microcup displays are significantly better than any displays previously known including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive which would limit and predefine the size of the display panel and confine the display fluid inside a predefined area. The display fluid within a conventional display prepared by the edge sealing adhesive method will leak out completely if the display is cut in any way, or if a hole is drilled through the display. The damaged display will be no longer functional. In contrast, the display fluid within the display prepared by the microcup technology is enclosed and isolated in each cell. The microcup display may be cut to almost any dimensions without the risk of damaging the display performance due to the loss of the display fluid in the active areas. In other words, the microcup structure enables a format flexible display manufacturing process, wherein the process produces a continuous output of display panel in a large sheet format which can be cut into any desired format. The isolated microcup or cell structure is particularly important when cells are filled with fluids of different specific properties such as colors and switching rates. Without the microcup structure, it will be very difficult to prevent the fluids in adjacent areas from intermixing or being subject to cross-talk during operation.

In order to achieve a higher contrast ratio, one of two approaches may be taken: (1) using a darkened background to reduce the light leaking through the inactive partition wall or (2) using microcups of wider opening and narrower partition to increase the payload. However, the darkened background typically results in a lower reflectivity at the Dmin state. On the other hand, display cells formed from wider microcups and narrower partition walls tend to have a poor resistance against compression and/or shear forces imposed by, for example, a sharp stylus for a touch screen panel.

SUMMARY OF THE INVENTION

The present application is directed to a novel multilayer EPD structure which has shown improved contrast ratio, switching performance, reflectivity at the Dmin state and structural integrity. In this type of multiplayer EPD structure, shallower microcups may be employed to achieve an acceptable contrast ratio with improved reflectivity at the Dmin state. As a result, the manufacturing cost is significantly reduced and the release properties during microembossing are also considerably improved.

The first aspect of the invention is directed to an electrophoretic display having two or more layers of display cells stacked together. The display cells are filled with electrophoretic display fluids and individually sealed.

The second aspect of the invention is directed to an electrophoretic display having two or more layers of display cells stacked together and the cells are filled with electrophoretic fluids of different colors, optical densities or switching speeds.

The third aspect of the invention is directed to an electrophoretic display having two or more layers of display cells stacked together and the cells are of different shapes, dimensions or ratios of opening to total area.

The fourth aspect of the invention is directed to an electrophoretic display having two or more layers of display cells stacked together and in the stack the inactive partition areas of one layer are at least partially overlapped with the active cell areas of the layer above or underneath, preferably completely overlapped. The term "staggered" will be used throughout the application to describe this arrangement. The staggered arrangement is necessary to allow the colors from the cells (generated by reflection or absorption of the light) in a lower layer to be seen through the partition areas of an upper layer.

The fifth aspect of the invention is directed to an electrophoretic display having two or more layers of display cells stacked together and in the stack the bottom layer comprises cells which are filled with an electrophoretic fluid comprising white pigment particles or pigment-containing microparticles dispersed in a black solvent or solvent mixture.

The sixth aspect of the invention is directed to a full color or multi-color electrophoretic display having two layers of display cells stacked together and the upper layer comprises red, green or blue cells which are filled with electrophoretic display fluids comprising white pigment particles or pigment-containing microparticles dispersed in red, green or blue solvents or solvent mixture, respectively.

The seventh aspect of the invention is directed to a full color or multi-color electrophoretic display having two layers of display cells stacked together and the bottom layer comprises black cells which are filled with an electrophoretic fluid comprising white pigment particles or pigment-containing microparticles dispersed in a black solvent or solvent mixture and the black cells are positioned with inactive partition areas of the upper layer in a staggered fashion.

The eighth aspect of the invention is directed to a full color or multi-color electrophoretic display having two layers of display cells stacked together. The bottom layer comprises red, green, blue and black cells which are filled with electrophoretic display fluids comprising white pigment particles or pigment-containing microparticles dispersed in red, green, blue and black solvent or solvent mixture, respectively. The top layer comprises red, green and blue cells which are filled with electrophoretic display fluids comprising white pigment particles or pigment-containing microparticles dispersed in red, green and blue solvent or solvent mixture, respectively. The colored cells and the inactive partition areas of the two layers are arranged in a staggered fashion with the black cells of the bottom layer registered to the inactive partition areas of the top layer.

The pigment particles or pigment-containing microparticles may also be magnetic.

The ninth aspect of the invention is directed to an electromagnetophoretic display having two or more layers of display cells stacked together. The bottom layer comprises display cells which are filled with an electromagnetophoretic fluid comprising a mixture of black magnetic particles and white non-magnetic particles dispersed in a colorless clear solvent or solvent mixture. The top layer may comprise red, green and blue cells which are filled with electrophoretic fluids comprising white particles dispersed in red, green and blue solvents or solvent mixtures, respectively. Alternatively, the top layer may comprise display cells which are filled with an electrophoretic fluid comprising a mixture of white and colored particles dispersed in a colorless clear solvent or solvent mixture.

The tenth aspect of the invention is directed to methods for the manufacture of an electrophoretic display having two or more layers of display cells stacked together, as described in the first through ninth aspect of the invention.

While the term "display cell" is used in this application, it is understood that the term broadly covers the partition type display cells, the microgroove or microchannel type display cells (U.S. Pat. No. 3,612,758), the microcapsule type display cells (U.S. Pat. Nos. 5,961,804, 5,930,026 and 6,017,584) and the display cells prepared according to the microcup technology as described in WO01/67170.

When the term "microcup" is used in the application, it is understood that the multilayer display of the present invention is also applicable to other display cells such as the partition type display cells, the microgroove or microchannel type display cells and the microcapsule type display cells.

In the multiplayer EPD, the top (or upper) layer referred to above is usually the viewing side whereas the bottom (or lower) layer is the non-viewing side.

BRIEF DESCRIPTION OF THE DRAWINGS

FIG. 3a shows a process of preparing a two layer electrophoretic display by laminating two microcup layers with the sealing sides of the microcups facing each other. FIG. 3b shows another process of preparing a two layer electrophoretic display by (i) transferring a microcup layer from a release substrate onto a second microcup layer on a conductor film and (ii) laminating the resultant composite film onto a conductor film, optionally with an adhesive. The process (i) may be repeated to prepare an electrophoretic display having more than two layers of display cells.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the cells.

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmin state to the % reflectance of the display at the Dmax state.

I. PREFERRED EMBODIMENT

Figure 1:
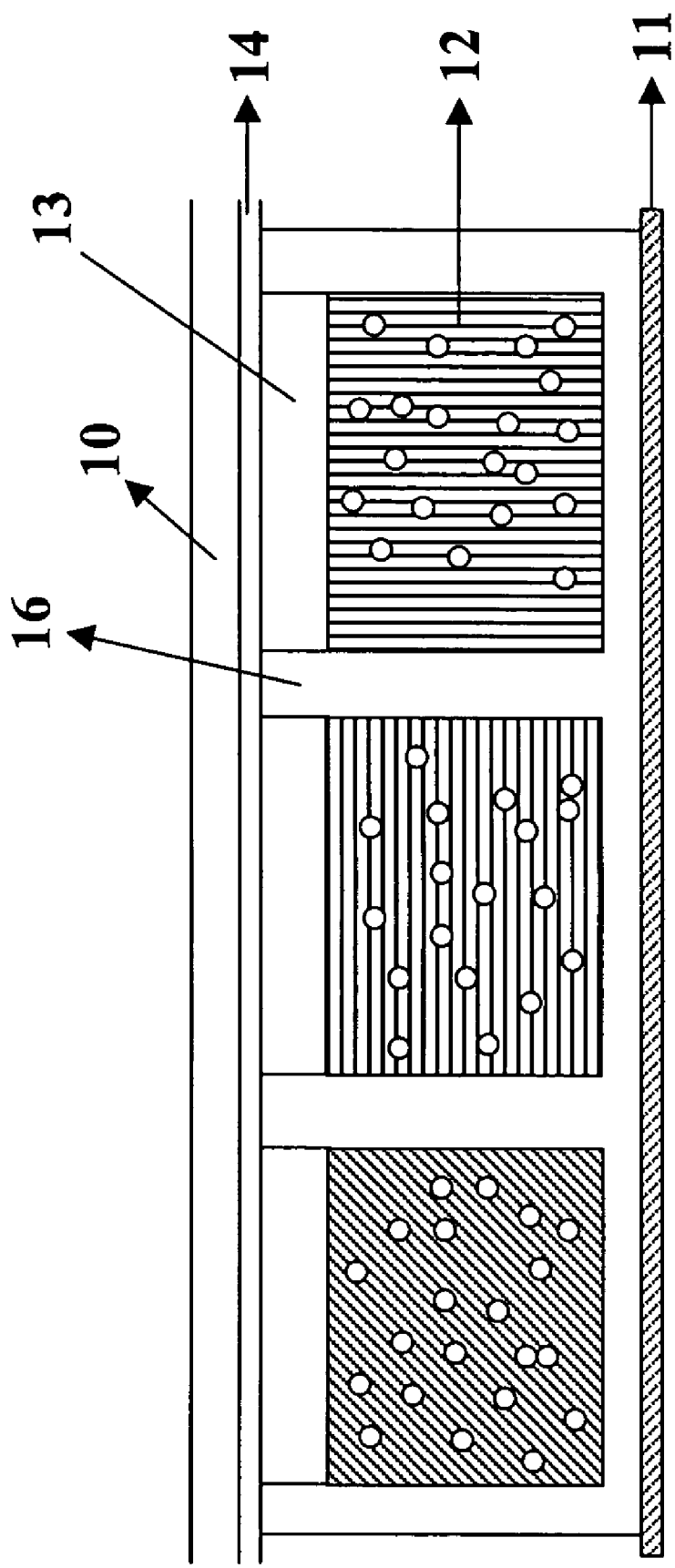
FIG. 1 shows a typical electrophoretic display cell prepared by the microcup technology with a darkened background to improve the contrast ratio. In both the "on" and "off" states, the viewer will see the background color through the inactive partition areas. A display having a low reflectivity in the Dmin state is obtained.

Electrophoretic display cells prepared by the microcup technology, as shown in FIG. 1, comprise two conductor films (10, 11), at least one of which is transparent (10), and a layer of cells (12) enclosed between the two conductor films. The cells are filled with charged pigment particles or pigment-containing microparticles dispersed in a colored dielectric solvent and sealed with a sealing layer (13). Not shown in FIG. 1, the sealing layer preferably extends over the partition walls (16) and forms a contiguous layer thereon. The sealed cells are laminated onto the second conductor film (10) optionally with an adhesive layer (14). When a voltage difference is imposed between the two conductor films, the charged particles migrate to one side, such that either the color of the pigment or the color of the solvent is seen through the transparent conductor film (10). In addition, at least one of the two conductor films is patterned. To improve the contrast ratio of the EPD, one of two approaches are typically taken: (a) using microcups of a higher payload (a higher aspect ratio and/or a higher ratio of opening area to total area) or (b) using a blackened conductor film (11) on the non-viewing side. Since no light scattering particles are present in the inactive partition areas (16), the viewer will see the background color through the partition areas in both the "on" and "off" states. The blackened background of such a single layer EPD results in a higher Dmax and contrast ratio, but a lower reflectivity in the Dmin state. Moreover, the use of high payload cells, on the other hand, increases not only the degree of difficulty but also the cost of manufacturing.

Figure 2:
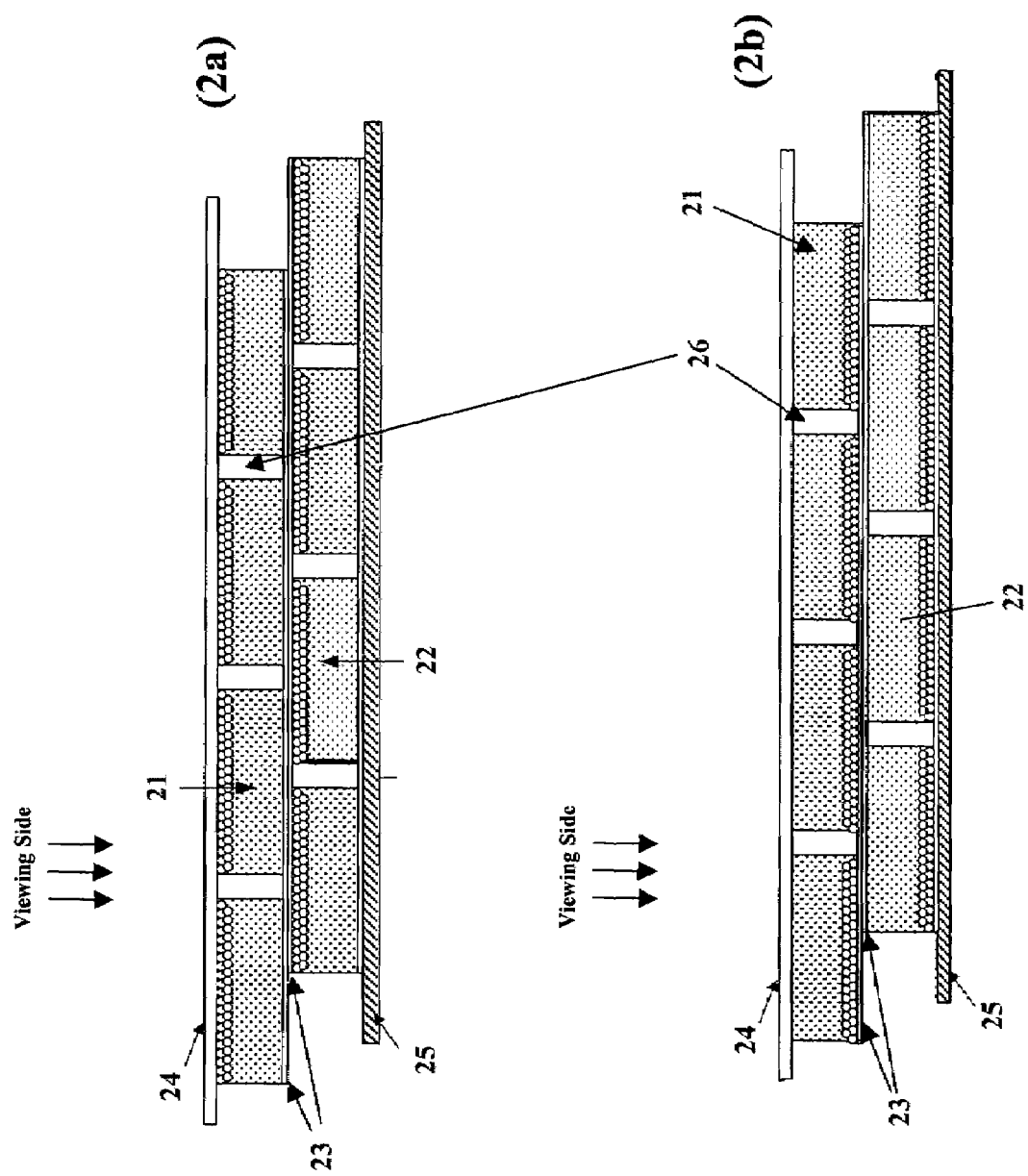
FIGS. 2a and 2b show the "on" (Dmin) and "off" (Dmax) states, respectively, of a two-layer electrophoretic display. At the Dmin state, white particles of both layers will be attracted to the top of the microcups. The inactive partition areas of the upper layer will appear white since light is reflected back by the white particles in the bottom microcup layer. In contrast, at the Dmax state, white particles of both layers are attracted to the bottom of the microcups, the inactive partition areas of the upper layer will appear colored since light is absorbed by the colored solvent in the bottom microcup layer.

The tradeoff between contrast ratio and reflectivity in the Dmin state is eliminated in the staggered two layer structure depicted in FIGS. 2a and 2b.

In the two figures, the display has an upper cell layer (21) and a lower cell layer (22). The cells of the two layers are individually sealed with a sealing layer (23). The two layers are arranged in a staggered fashion and the sealing sides of the two layers face each other. The two layer structure is sandwiched between a top transparent conductor film (24) and a bottom conductor film (25).

At the "on" state (FIG. 2a), the white particles in both upper and lower layers are attracted to the top of the cells (toward the viewing side). The partition areas (26) of the top layer will appear "white" since light is reflected back by the particles in the lower layer. In contrast, at the "off" state (FIG. 2b), the white particles in both layers are attracted to the bottom of the cells (toward the non-viewing side). The partition areas of the top layer will appear "colored" since light is absorbed by the colored dielectric solvent in the lower layer. As a result, Dmax and contrast ratio of the display may be improved without the tradeoff in the reflectivity in the Dmin state.

The two-layer or multilayer EPD also allows the use of cells with a lower payload (a lower aspect ratio and a lower ratio of opening area to total area) to achieve a high contrast ratio with a higher reflectivity at the Dmin state. This also significantly improves the release properties of the microembossing process and reduces the cost and degree of difficulty in the manufacture of a mold for microembossing.

Preparation of the Microcups

The microcup-based display cells may be prepared by either microembossing, photolithography or pre-punched holes as disclosed in copending patent applications, U.S. Ser. No. 09/518,488 filed on Mar. 3, 2000 (corresponding to WO01/67170), U.S. Ser. No. 09/942,532 filed on Aug. 29, 2002 (U.S. patent application Publication No. 2002-75556 published on Jun. 20, 2002), U.S. Ser. No. 09/606,654 filed on Jun. 28, 2000 (corresponding to WO02/01280) and U.S. Ser. No. 09/784,972 filed on Feb. 15, 2001 (corresponding to WO02/65215), all of which are incorporated herein by reference in their entirety.

In general, the microcup-based cells can be of any shape, and their sizes and shapes may vary. The cells may be of substantially uniform size and shape in one system. However, in order to maximize the optical effect, cells having a mixture of different shapes and sizes may be produced. For example, cells filled with a dispersion of a red color may have a different shape or size from the green cells or the blue cells. Furthermore, a pixel may consist of different numbers of cells of different colors. For example, a pixel may consist of a number of small green cells, a number of large red cells and a number of small blue cells. It is not necessary to have the same shape and number for the three colors.

The openings of the microcups may be circular, square, rectangular, hexagonal or any other shape. The partition areas between the openings are preferably kept small in order to achieve a high color saturation and contrast ratio while maintaining desirable mechanical properties. Consequently, the honeycomb-shaped opening is preferred over, for example, the circular opening.

For reflective electrophoretic displays, the dimension of each individual microcup may be in the range of about $10^2$ to about $10^6$ $\mu m^2$, preferably from about $10^3$ to about $10^5$ $\mu m^2$. The depth of the microcups is in the range of about 3 to about 100 microns, preferably from about 10 to about 50 microns. The ratio of opening area to total area is in the range of from about 0.1 to about 0.95, preferably from about 0.4 to about 0.90. The width of the partition between microcups is in the range of from about 2 to about 50 microns, preferably from about 5 to about 20 microns.

II. PREPARATION OF ELECTROPHORETIC FLUID

The electrophoretic display fluid may also be prepared by methods known in the art, such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. AppL. Phys.* 49(9), 4820 (1978). The charged pigment particles visually contrast with the medium in which the particles are suspended. The medium is a dielectric solvent which preferably has a low viscosity and a dielectric constant in the range of about 2 to about 30, preferably about 2 to about 15, for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Solvay Solexis or Krytox Oils and Greases K-Fluid Series from DuPont, Delaware. In one preferred embodiment, poly(chlorotrifluoroethylene) is used as the dielectric solvent. In another preferred embodiment, poly(perfluoropropylene oxide) is used as the dielectric solvent.

The suspending medium may be colored by dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone red 111, 135, anthraquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge controlling agent, or may acquire a charge when suspended in the dielectric solvent. Suitable charge controlling agents are well known in the art; they may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex from International Specialty Products), (meth)acrylic acid copolymers or N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and URfrom Dupont.

Suitable charged pigment dispersions may be manufactured by any of the well-known methods including grinding, milling, attriting, microfluidizing and ultrasonic techniques.

For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

Density matched pigment-containing microparticles may be prepared according to methods disclosed in copending US patent applications, U.S. Ser. No. 10/335,210 filed on Dec. 31, 2002 (corresponding to WO03/58335), U.S. Ser. No. 10/335,051 (corresponding to WO03/57360) also filed on Dec. 31, 2002, U.S. Ser. No. 10/632,171 filed Jul. 30, 2003 and U.S. Ser. No. 10/364,270 (corresponding to WO03/69403) filed on Feb. 10, 2003, the contents of all of which are incorporated herein by reference in their entirety.

For a black/white electrophoretic display, the suspension comprises charged white particles of titanium oxide ($TiO_2$) dispersed in a blackened dielectric solvent containing a black dye or dye mixture, or charged black particles. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged $TiO_2$ particles or $TiO_2$-containing particles may be suspended in a dielectric solvent of cyan, yellow or magenta color. The cyan, yellow or magenta color may be generated via the use of a dye or a pigment. For an additive color system, the charged $TiO_2$ particles or $TiO_2$-containing particles may be suspended in a dielectric solvent of red, green or blue color generated also via the use of a dye or a pigment. The red, green and blue color system is preferred for most applications.

III. SEALING OF THE MICROCUPS

The microcup-based cells may be filled with an electrophoretic fluid and sealed as disclosed in WO 01/67170 and copending patent applications, U.S. Ser. No. 09/874,391 (corresponding to WO02/98977) filed Jun. 4, 2001, U.S. Ser. No. 10/618,257 filed on Jul. 10, 2003, U.S. Ser. No. 10/665,898 filed on Sep. 18, 2003 and U.S. Ser. No. 10/651,540 filed on Aug. 29, 2003, the contents of all of which are incorporated herein by reference in their entirety. The sealing of the microcups may be accomplished in a number of ways. For example, it may be accomplished by overcoating the filled microcups with a sealing composition comprising a solvent and a sealing material selected from the group consisting of thermoplastic elastomers, polyurethanes, polyvalent acrylates or methacrylates, cyanoacrylates, polyvalent vinyls including vinylbenzenes, vinylsilanes, vinylethers, polyvalent epoxides, polyvalent isocyanates, polyvalent allyls, oligomers or polymers containing crosslinkable functional groups and the like. Additives such as polymeric binder or thickener, photoinitiator, catalyst, filler, colorant or surfactant may be added to the sealing composition to improve the physicomechanical and optical properties of the display. The sealing composition is essentially incompatible with the electrophoretic fluid and has a specific gravity lower than that of the electrophoretic fluid. Upon solvent evaporation, the sealing composition forms a conforming seamless seal on top of the filled microcups. The sealing layer may be further hardened by heat, radiation, e-beam, moisture, interfacial crosslinking or other curing methods. Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. To further reduce the degree of intermixing, it is highly desirable that the specific gravity of the overcoating is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. This two-pass overcoating process is particularly useful when the dye used is at least partially soluble in the sealing composition.

Sealing with a composition comprising a thermoplastic elastomer or polyurethane copolymer is particularly preferred. Examples of thermoplastic elastomers include tri-block or di-block copolymers of styrene and isoprene, butadiene or ethylene/butylene, such as the Kraton™ D and G series from Kraton Polymer Company. Crystalline rubbers such as poly(ethylene-co-propylene-co-5-methylene-2-norbornene) and other EPDM (Ethylene Propylene Diene Rubber terpolymer) from Exxon Mobil have also been found very useful.

Alternatively, the sealing composition may be dispersed into an electrophoretic fluid by, for example, an in-line mixer and immediately coated onto the microcups with a precision coating mechanism such as Myrad bar, gravure, doctor blade, slot coating or slit coating. Volatile organic solvents may be used to control the viscosity and coverage of the electrophoretic fluid. Excess fluid may be scraped away by a wiper blade or a similar device. A small amount of a weak solvent or solvent mixture such as isopropanol, methanol or aqueous solutions thereof may be used to clean the residual electrophoretic fluid on the top surface of the partition walls of the microcups. The sealing composition is essentially incompatible with the electrophoretic fluid and is lighter than the electrophoretic fluid. Upon phase separation and solvent evaporation, the sealing composition floats to the top of the filled microcups and forms a seamless sealing layer thereon. The sealing layer may be further hardened by heat, radiation or other curing methods. This is the one-pass sealing process.

In either of the two sealing processes, the polymeric sealing layer is in contact with the top surface of the electrolytic fluid. The sealing layer encloses the electrolytic fluid within each cell and sealingly adheres to the surface of the partition walls. The sealed microcups finally are laminated with the second conductor film (10) optionally precoated with an adhesive layer (14).

A preferred group of dielectric solvents exhibiting desirable density and solubility discrimination against most commonly used polymers and precursors thereof are halogenated, particularly fluorinated, hydrocarbons and derivatives thereof. Surfactants may be used to improve the adhesion and wetting at the interface between the electrophoretic fluid and the sealing composition. Useful surfactants include the FC surfactants from 3M Company, Zonyl fluorosurfactants from DuPont, fluoroacrylates, fluoromethacrylates, fluorosubstituted long chain alcohols, perfluoro-substituted long chain carboxylic acids and derivatives thereof.

IV. PREPARATION OF A SINGLE LAYER ELECTROPHORETIC DISPLAY PANEL

The process can be a continuous roll-to-roll process as disclosed in WO01/67170. It may comprise the following steps:
1. Coat a layer of thermoplastic or thermoset precursor optionally with a solvent on a conductor film. The solvent, if present, readily evaporates.
2. Emboss the thermoplastic or thermoset precursor layer at a temperature higher than the glass transition temperature of the thermoplastic or thermoset precursor layer by a pre-patterned male mold.
3. Release the mold from the thermoplastic or thermoset precursor layer preferably during or after it is hardened by proper means.
4. Fill the microcups thus formed with an electrophoretic fluid and seal the filled microcups by either the one-pass or two-pass process described above.
5. Laminate an array of sealed microcups with a second conductor film, optionally with an adhesive layer which may be a pressure sensitive adhesive, a hot melt adhesive, a heat, moisture or radiation curable adhesive.

The laminate adhesive may be post cured by radiation such as UV through the top conductor film if the latter is transparent to the radiation. The finished product may be cut to various sizes and shapes after the lamination step.

The preparation of the microcups described above can be conveniently replaced by the alternative procedure of photolithography as disclosed in WO01/67170. A full color EPDs may be prepared by sequentially filling red, green and blue electrophoretic fluids into the microcups and subsequently sealing the filled microcups as described above.

V. ELECTROPHORETIC DISPLAY HAVING MULTIPLE LAYERS OF DISPLAY PANEL AND ITS MANUFACTURE

Figure 3A:
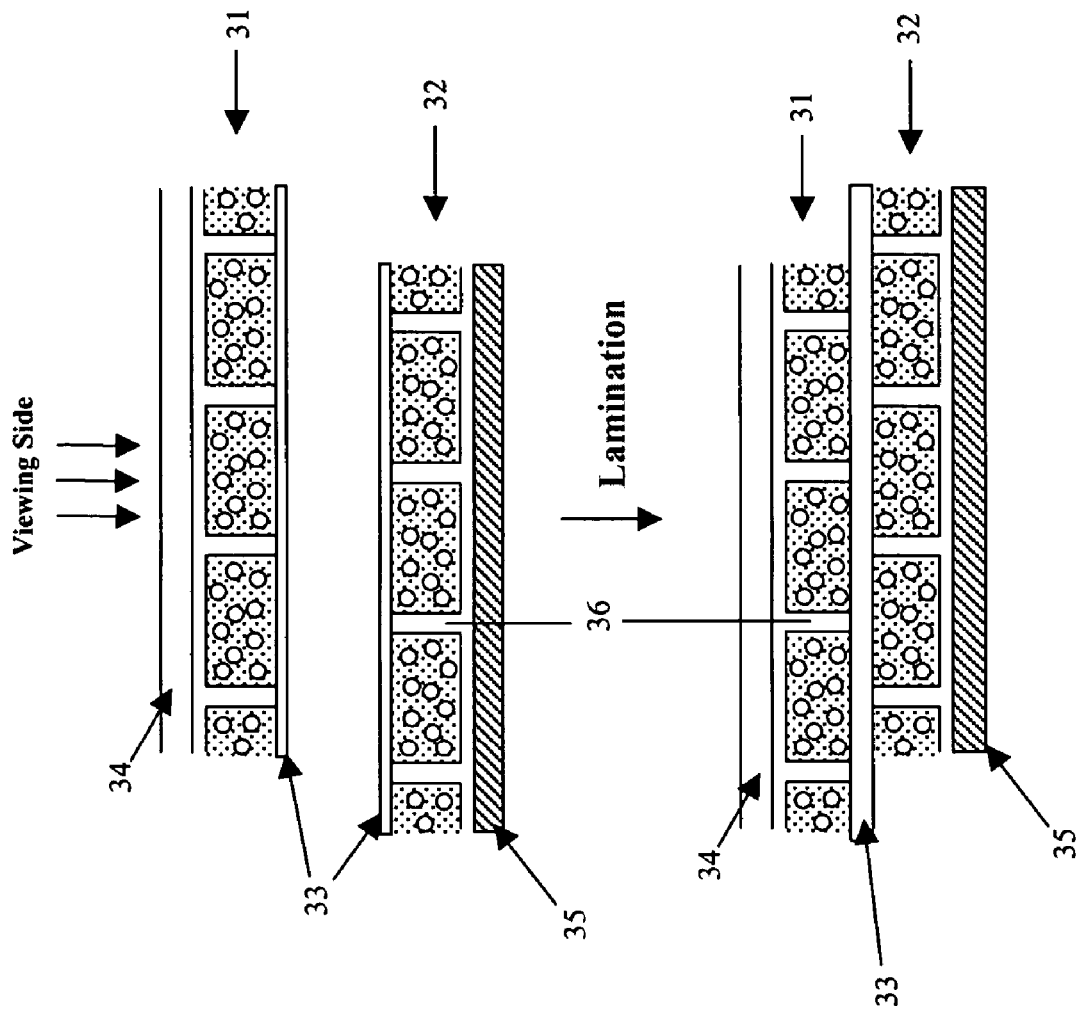
FIGS. 3a and 3b show the methods for the manufacture of an electrophoretic display having two or more layers of display cells.
Figure 3B:
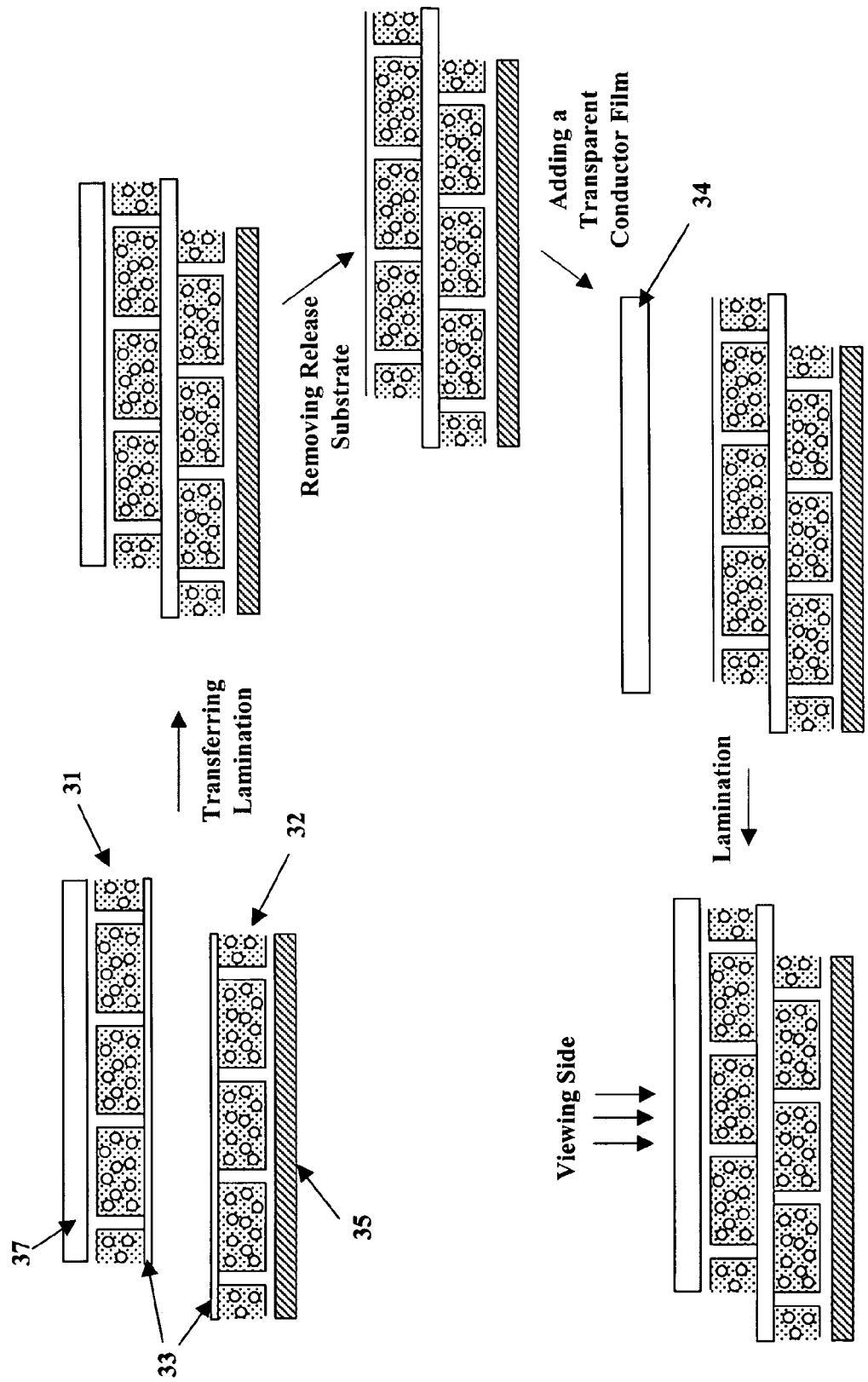

FIGS. 3a and 3b show the methods for the manufacture of an electrophoretic display having two or more layers of display cells.

FIG. 3a shows the process of preparing a two layer electrophoretic display by laminating a top layer (31) and a bottom layer (32) of display cells prepared by, for example, the procedure described in the steps 1–4 in Section IV. The filled display cells are individually sealed with a sealing layer (33). The conductor film (34) on the viewing side is transparent and the conductor film (35) on the non-viewing side may be blackened. An adhesive layer may be used to facilitate the lamination process. The two layers (31 and 32) are arranged with the inactive partition areas (36) of one layer and the active cell areas of another layer in a staggered fashion.

FIG. 3b shows another process of preparing a two layer electrophoretic display by (i) preparing a layer of display cells (32) on a conductor film (35) by, for example, the procedure described in the steps 1–4 in Section IV; (ii) preparing another layer of display cells (31) on a release substrate (37) by the same procedure in (i); (iii) laminating the layer of display cells (31) on the release substrate (37) onto the layer (32), optionally with an adhesive (not shown); (iv) removing the release substrate and (v) laminating the resultant composite film onto a conductor film (34), optionally with an adhesive (not shown). The steps (ii), (iii), and (iv) may be repeated to prepare an electrophoretic display having more than two layers of display cells.

In the two-layer or multilayer electrophoretic display as prepared above, it is important that the inactive partition areas of a microcup layer are arranged with the active microcup areas of another layer in a staggered manner. At least one of the two conductor films (34 and 35) is pre-patterned. Also at least the conductor film (34) on the viewing side is transparent.

Figure 4:
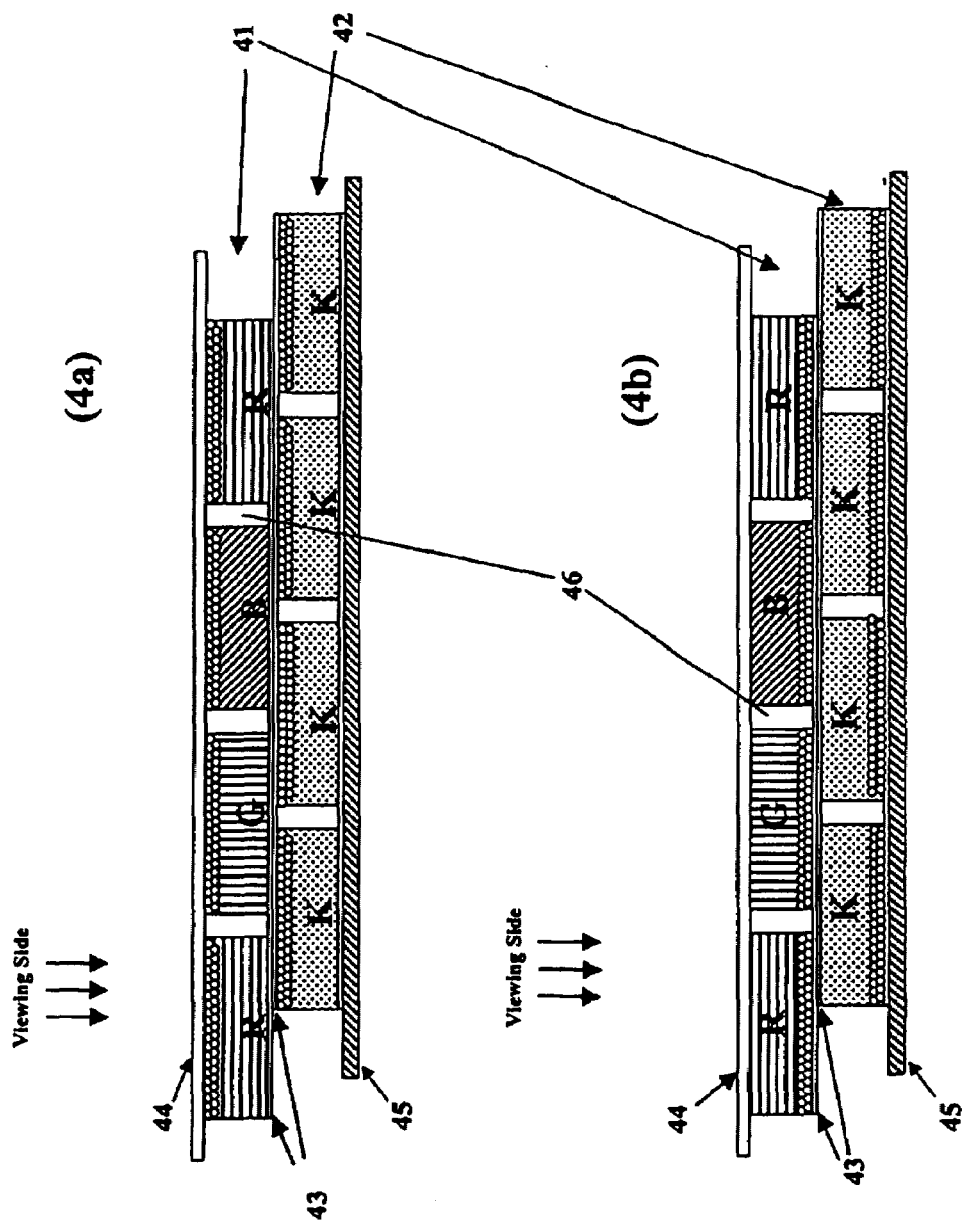
FIGS. 4a and 4b show a two-layer color electrophoretic display wherein the top layer comprises microcups filled with red, green and blue electrophoretic fluids and the bottom layer comprises microcups filled with a black electrophoretic fluid.

FIGS. 4a and 4b show a two-layer color electrophoretic display wherein the top layer (41) comprises display cells filled with red, green and blue electrophoretic fluids and the bottom layer (42) comprises display cells filled with a black electrophoretic fluid. In both figures, the inactive partition areas (46) of the upper layer (41) are staggered with the active cell areas of the lower layer (42). The two layer structure is sandwiched between two conductor films (44) and (45). At least one of the two conductor films is transparent.

Figure 5:
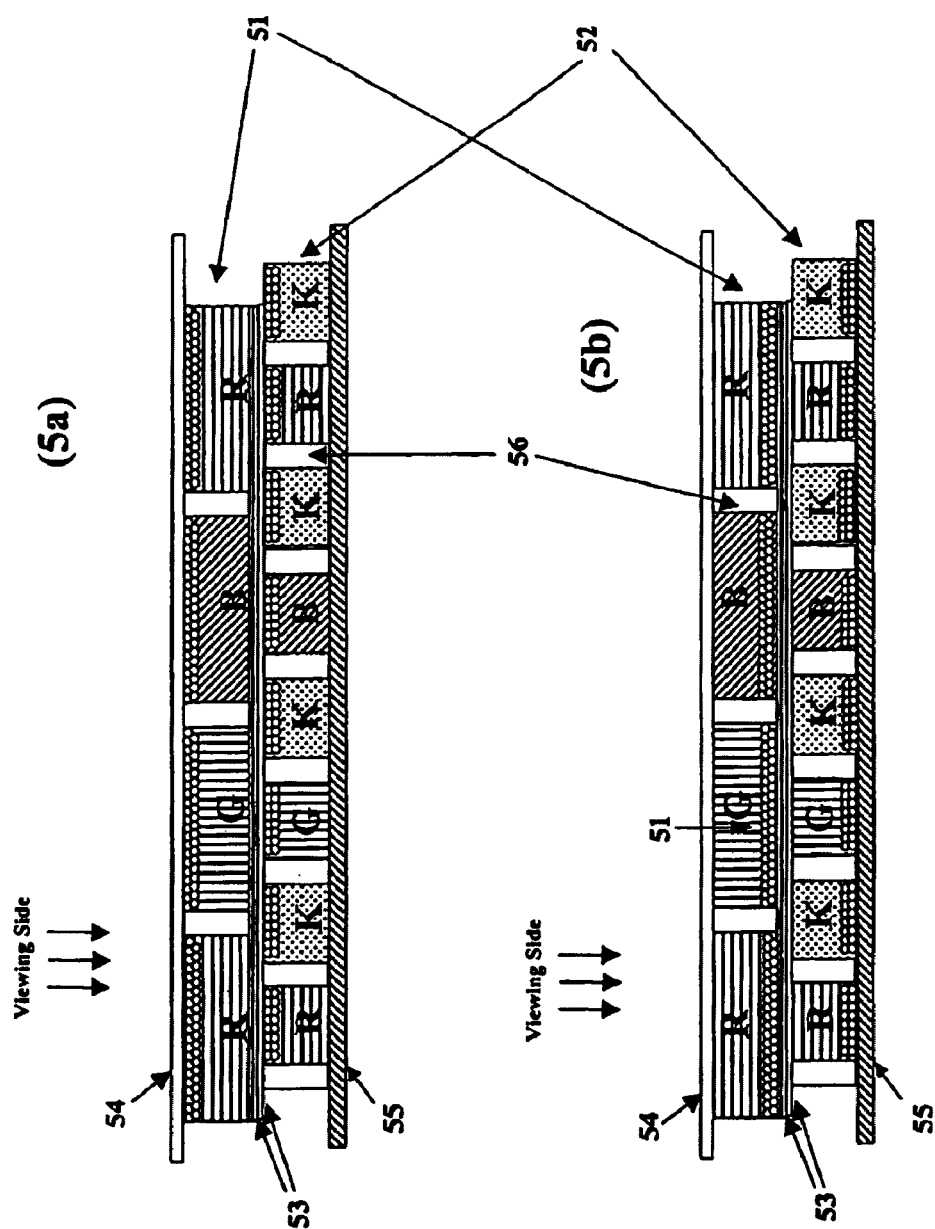
FIGS. 5a and 5b show a two-layer full color electrophoretic display wherein the top layer comprises microcups filled with red, green and blue electrophoretic fluids and the bottom layer comprises microcups filled with red, green, blue and black electrophoretic fluids. The red, green, blue and inactive partition areas of the upper layer are overlapped with registration to the red, green, blue and black microcups of the lower layer, respectively.

FIGS. 5a and 5b show a two layer full color electrophoretic display wherein the top layer (51) comprises display cells filled with red, green and blue electrophoretic fluids and the bottom layer (52) comprises display cells filled with red, green, blue and black electrophoretic fluids. The colored cells and the inactive partition areas (56) of the two layers are arranged in a staggered manner so that the red, green, blue and inactive partition areas of the top layer (51) are overlapped with registration to the red, green, blue and black microcups of the bottom layer (52), respectively. The two layer structure is sandwiched between two conductor films (54) and (55). At least one of the two conductor films is transparent.

In the two layer structure, the top microcup layer may be laminated onto the bottom layer at an appropriate angle to avoid formation of the undesirable Moire pattern. Alternatively, a less symmetrical microcup array may be used for similar purposes.

The pigment particles or the colorant particles may also be magnetic. In one embodiment, a two-layer electromagnetophoretic display may have a bottom layer comprises display cells which are filled with an electromagnetophoretic fluid comprising a mixture of black magnetic particles and white non-magnetic particles dispersed in a colorless clear solvent or solvent mixture. The top layer may comprise red, green and blue cells which are filled with electrophoretic fluids comprising white particles dispersed in red, green and blue solvents, respectively. Alternatively, the top layer may comprise display cells which are filled with an electrophoretic fluid comprising a mixture of white and black particles dispersed in a colorless clear solvent or solvent mixture.

Details of the electromagnetophoretic display layer are disclosed in pending applications, U.S. Ser. No. 10/394,488 filed on Mar. 20, 2003 and U.S. Ser. No. 10/421,217 filed on Apr. 22, 2003, the contents of both are incorporated herein in their entirety by reference.

In general, the cell gap or the shortest distance between the two conductor films in a multilayer display is preferably in the range of 15 to 200 µm, more preferably in the range of 20 to 50 µm. The thickness of each display cell layer may be varied preferably in the range of 10 to 100 µm, more preferably in the range of 12 to 30 µm. The concentration of particles and dyes or colorants in each display cell layer may also be varied for different applications.

EXAMPLES

The following examples are given to enable those skilled in the art to more clearly understand and to practice the present invention. They should not be considered as limiting the scope of the invention, but merely as being illustrative and representative thereof.

Preparation 1

Synthesis of a Multifunctional Reactive Protective Colloid $R_f$-amine

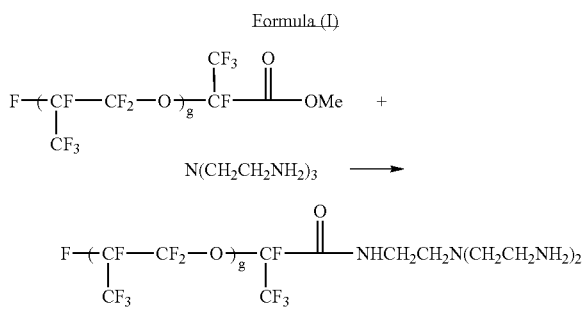

17.8 Gm of Krytox® methyl ester (DuPont, 17.8 g, MW=about~1780, g=about 10, DuPont) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of PFS2 solvent (low molecular weight perfluoropolyether from Solvay Solexis) and extracted with 20 ml of ethyl acetate three times, then dried to yield 17 gm of purified product ($R_f$-amine1900) which showed excellent solubility in HT200. The product ($R_f$-amine1780) showed good solubility in HT200.

Other reactive multifunctional $R_f$-amines of Formula (I) having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure.

Preparation 2

Preparation of TiO$_2$-Containing Microcapsules 9.05 Gm of Desmodur® N3400 aliphatic polyisocyanate (from Bayer AG) and 0.49 gm of triethanolamine (99%, Dow) were dissolved in 3.79 gm of MEK. To the resultant solution, 13 gm of TiO$_2$ R706 (DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (molecular weight 725, from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 prepared from Preparation 1 in 40.0 gm of HT-200 (Solvay Solexis) was added and homogenized for 2 minutes, followed by addition of additional 0.9 gm of $R_f$-amine 4900 in 33.0 gm of HT-200 and homogenization for 2 minutes. A low viscosity microcapsule dispersion was obtained.

The microcapsule dispersion obtained was heated at 80° C. overnight and stirred under low shear to post-cure the particles. The resultant microcapsule dispersion was filtered through a 400-mesh (38 micrometer) screen. The particle and the solid content of the filtered dispersion was measured to be 29 wt % by weight with an IR-200 Moisture Analyzer (Denver Instrument Company). The average particle size of the filtered dispersion was measured with a Beckman Coulter LS230 Particle Analyzer to be about 2 µm.

An EPD fluid containing 1.0 wt % by weight of CuPc—C$_8$F$_{17}$ (structure given below and prepared according to U.S. Pat. No. 3,281,426) and various amount of the resultant TiO$_2$-containing microcapsule dispersion in HT-200 was filled into the microcups which were then sealed and sandwiched between two ITO/PET films according to the procedure described in Preparation 3.

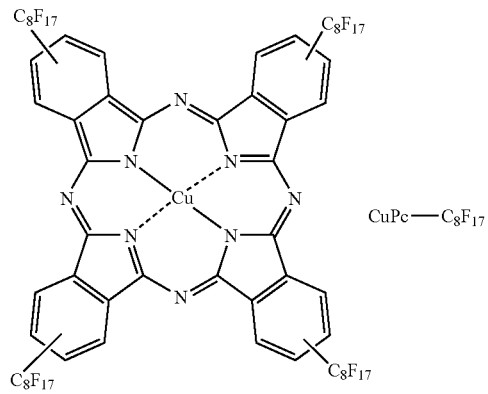

Preparation 3A

Primer Coated Transparent Conductor Film

A primer coating solution containing 33.2 gm of EB 600™ (acrylated epoxy oligomer, UCB, Smyrna, GA), 16.12 gm of SR 399™ (pentafunctional monomer, Sartomer, Exton, PA), 16.12 gm of TMPTA (trimethylolpropane triacrylate, UCB, Smyrna, Ga.), 20.61 gm of HDODA (1,6-hexanediol diacrylate, UCB, Smyrna, Ga.), 2 gm of Irgacure™ 369 [(2-benzyl-2-(dimethylamino)-1-[4-(4-morpholinyl)phenyl]-1-butanone), Ciba, Tarrytown, N.Y.], 0.1 gm of Irganox™ 1035 [thiodiethylene bis(3,5-di(tert)-butyl-4-hydroxyhydrocinnamate), Ciba], 44.35 gm of poly (ethyl methacrylate) (MW. 515,000, Aldrich, Milwaukee, Wis.) and 399.15 gm of MEK (methyl ethyl ketone) was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes and exposed to 1.8 J/cm$^2$ of UV light under nitrogen using a UV conveyer (DDU, Los Angles, Calif.).

Preparation 3B

Preparation of Microcups

TABLE 1

| Microcup Composition | | |
|---|---|---|
| Component | Weight Part | Source |
| EB 600 | 33.15 | UCB |
| SR 399 | 32.24 | Sartomer |
| HDODA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

33.15 Gm of EB 600™ (acrylated epoxy oligomer, UCB, Smyrna, Ga.), 32.24 gm of SR 399™ (pentafunctional monomer, Sartomer, Exton, Pa.), 6 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 [(2-benzyl-2-(dimethylamino)-1-[4-(4-morpholinyl)phenyl]-1-butanone), Ciba, Tarrytown, N.Y.], 0.04 gm of ITX (Isopropyl-9H-thioxanthen-9-one, Aldrich, Milwaukee, Wis.), 0.1 gm of Irganox™ 1035 [thiodiethylene bis(3,5-di(tert)-butyl-4-hydroxyhydrocinnamate), Ciba, Tarrytown, N.Y.] and 20.61 gm of HDODA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by centrifuge at 2000 rpm for about 15 minutes.

The microcup composition was slowly coated onto a 4"×4" electroformed Ni male mold for an array of 100 μm (length)×100 μm (width)×25 μm (depth)×15 μm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 3A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm$^2$ was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm$^2$.

Preparation 3C

Filling and Sealing with a Sealing Composition

An electrophoretic fluid containing 9.7% by weight (dry weight) of the TiO$_2$-containing microcapsules prepared according to the Preparation 2, 1.0% by weight of CuPc—C$_8$F$_{17}$ and 0.5% by weight of R$_f$-amine2000 (based on the total dry weight of the TiO$_2$-containing microcapsule) prepared according to Preparation 1 in HT-200 was filled into the 4"×4" microcup array prepared from Preparation 3B using a #0 drawdown bar. The excess of fluid was scraped away by a rubber blade.

A sealing composition containing 14% by weight of polyurethane IROSTIC P9815-20 (from Huntsman Polyurethane) in MEK/IPAc/CHO (47.5/47.5/5) was overcoated onto the filled microcups using a Universal Blade Applicator and dried at room temperature to form a seamless sealing layer of about 2–3 μm dry thickness with good uniformity.

The lamination of the conductor film over the sealed microcups was accomplished by pressing the ITO side of an ITO/PET film (5 mil) onto the sealing layer by a laminator at 120° C. and at the speed of 20 cm/min.

Comparative Example 1

Single Layer Microcup EPD

The resultant single layer microcup EPD prepared according to the Preparation 3C was then coated with a thin layer of black coating on the outer surface of a conductor film on the sealing side of the display (the non-viewing side). A conductor film on the side opposite to the sealing layer is the viewing side from which all the electro-optic performances were measured. The test results including contrast ratio and Dmin at various normalized field strengths were listed in Table 2.

Example 2

Staggered Two-Layer Microcup EPD

An electrophoretic fluid containing 6.0% by weight (dry weight) of the TiO$_2$-containing microcapsules prepared according to Preparation 2, 1.0 wt % by weight of CuPc—C$_8$F$_{17}$ and 0.5% by weight (based on the total dry weight of the TiO$_2$-containg microparticles) of R$_f$-amine2000 (from Preparation 1) in HT200 was filled and sealed into a microcup array prepared in Preparation 3C (the lower layer). The sealed microcup layer was laminated to a second sealed microcup layer (the upper layer) prepared in the Comparative Example 1 to form a staggered two-layer EPD film in which the inactive partition areas of the upper microcup layer were arranged in a staggered manner with registration to the active microcup areas of the lower layer. The resultant two-layer EPD film was evaluated as in the Comparative Example 1. The contrast ratio and Dmin at various normalized field strengths measured from the upper layer side are also summarized in Table 2.

Example 3

Staggered Two-Layer Microcup EPD

The same procedure of Example 2 was followed except that the upper microcup layer was filled with an electrophoretic fluid containing 9.7% by weight (dry weight) of TiO$_2$-containing microparticles from Preparation 2, 1.0% by weight of CuPc—C$_8$F$_{17}$ and 0.5% by weight (based upon the total dry weight of the TiO$_2$-containing microparticles) of R$_f$amine2000 in HT200; and the lower microcup layer was filled with 9.7% by weight of the TiO$_2$-containing microparticles, 1.5% by weight of CuPc—C$_8$F$_{17}$ and 0.5% by weight (based upon the total dry weight of the TiO$_2$-containg microparticles) of R$_f$amine 2000 in HT200. The contrast ratio and Dmin at various normalized field strengths are summarized in Table 2. The contrast ratio and Dmin are shown to have been further improved by the increases in dye and particle concentrations in the lower layer.

Example 4

Staggered Two-Layer Microcup EPD

The same procedure of Example 2 was followed, except that the electrophoretic fluid of the upper microcup layer contained 9.7% by weight of the $TiO_2$-containing microparticles from Preparation 2, 0.7% by weight of CuPc—$C_8F_{17}$ and 0.5% by weight (based upon the total dry weight of the $TiO_2$-containing microparticles) of $R_f$-amine2000 in HT200; and the lower microcup layer contained 9.7% by weight of the $TiO_2$-containing microparticles, 1.5% by weight of CuPc—$C_8F_{17}$ and 0.5% by weight (based upon the total dry weight of the $TiO_2$-containing microparticles) of $R_f$-amine2000 in HT200. The contrast ratio and Dmin at various normalized field strengths are summarized in Table 2.

TABLE 2

Contrast Ratios and Dmin of Examples 1–4

| | Upper Layer | | Lower Layer | | | Normalized field strength | | | |
|---|---|---|---|---|---|---|---|---|---|
| | wt % CuPc-C8F17 | wt % TiO2 microparticle | wt % CuPc-C8F17 | wt % TiO2 microparticle | | 10 | 20 | 30 | 40 |
| Comparative Example 1 | 1.0 | 9.7 | N.A. | N.A. | Contrast Ratio | 2.5 | 9.0 | 9.2 | 9.5 |
| | | | | | Dmin | 0.84 | 0.76 | 0.76 | 0.75 |
| Example 2 | 1.0 | 9.7 | 1.0 | 6.0 | Contrast Ratio | 3.5 | 12.3 | 13.5 | 14.0 |
| | | | | | Dmin | 0.76 | 0.69 | 0.69 | 0.68 |
| Example 3 | 1.0 | 9.7 | 1.5 | 9.7 | Contrast Ratio | 2.5 | 14.5 | 17 | 19 |
| | | | | | Dmin | 0.78 | 0.66 | 0.66 | 0.65 |
| Example 4 | 0.7 | 9.7 | 1.5 | 9.7 | Contrast Ratio | 5 | 8 | 9.5 | 9.5 |
| | | | | | Dmin | 0.75 | 0.67 | 0.65 | 0.65 |

It is evident from Table 2 that under the same normalized field strengths, all of the two-layer EPDs (Examples 2–4) showed significantly higher contrast ratio and lower Dmin (higher reflectivity in the Dmin state) than the single layer EPD (Comparative Example 1).

While the present invention has been described with reference to the specific embodiments thereof, it should be understood by those skilled in the art, that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic display which comprises more than one layer of display cells filled with electrophoretic fluids and said filled display cells are sealed with a polymeric sealing layer which is formed from a sealing composition having a specific gravity lower than that of said electrophoretic fluids.

2. The display of claim 1 wherein said filled display cells are sealed with a polymeric sealing layer.

3. The display of claim 2 wherein said polymeric sealing layer encloses the electrophoretic fluid within each cell and sealingly adheres to the surface of the partition walls of said cells.

4. The display of claim 3 wherein said cells are partially filled with said electrophoretic fluids.

5. The display of claim 1 wherein said polymeric sealing layer is in contact with the top surface of the electrophoretic fluid.

6. The display of claim 1 wherein said display cells are the partition type display cells.

7. The display of claim 1 wherein said display cells are the microgroove or microchannel type display cells.

8. The display of claim 1 wherein said display cells are microcapsules having a cell size ranging from about 10 to about 200 μm.

9. The display of claim 8 wherein said display cells are microcapsules having a cell size ranging from about 30 to about 120 μm.

10. The display of claim 1 wherein the more than one layer of display cells are sandwiched between two conductor films and the shortest distance between the two conductor films is in the range of about 15 to about 200 μm.

11. The display of claim 10 wherein the more than one layer of display cells are sandwiched between two conductor films and the shortest distance between the two conductor films is in the range of about 20 to about 50 μm.

12. The display of claim 1 wherein each layer of display cells has a thickness in the range of about 10 to about 100 μm.

13. The display of claim 12 wherein each layer of display cells has a thickness in the range of about 12 to about 30 μm.

14. The display of claim 1 wherein said display cells are filled with electrophoretic fluids of different colors, optical densities, switching speeds or magnetic properties.

15. The display of claim 1 wherein one of said more than one layer of display cells comprises display cells having shape, dimension or ratio of opening to total area different from those of display cells of another layer.

16. The display of claim 1 wherein said cells are separated by inactive partition areas and the electrophoretic fluid is enclosed within each cell by a polymeric sealing layer.

17. The display of claim 16 wherein said inactive partition areas of a layer are positioned with registration to areas of display cells filled with the electrophoretic fluids of another layer in a staggered fashion.

18. The display of claim 17 which comprises one top layer of display cells and one bottom layer of display cells.

19. The display of claim 18 comprising display cells which are filled with an electrophoretic fluid comprising white pigment particles or pigment-containing microparticles dispersed in a black solvent or solvent mixture.

20. The display of claim 18 wherein the top layer on the viewing side comprises red, green or blue cells which are filled with electrophoretic display fluids comprising white pigment particles or pigment-containing microparticles dispersed in red, green or blue solvent or solvent mixture, respectively.

21. The display of claim 18 which is a full color or multi-color electrophoretic display wherein the bottom layer on the non-viewing side comprises black cells which are filled with an electrophoretic fluid comprising white pigment particles or pigment-containing microparticles dispersed a black solvent or solvent mixture.

22. The display of claim 18 which is a full color or multi-color electrophoretic display wherein the bottom layer on the non-viewing side comprises red, green, blue and black cells which are filled with electrophoretic fluids comprising white pigment particles or pigment-containing microparticles dispersed in red, green, blue and black solvent or solvent mixture, respectively and the top layer comprises red, green and blue cells which are filled with electrophoretic fluids comprising white pigment particles or pigment-containing microparticles dispersed in red, green and blue solvent or solvent mixture, respectively.

23. The display of claim 22 wherein the cells and inactive partition areas of the two layers are arranged in a staggered fashion that the red, green and blue cells and the inactive partition areas of the top layer are registered to the red, green, blue and black cells of the bottom layer, respectively.

24. The electrophoretic display of claim 1 wherein said sealing composition comprises a thermoplastic elastomer, polyurethane, polyvalent acrylate or methacrylate, cyanoacrylate, polyvalent vinyl, polyvalent epoxide, polyvalent isocyanate, polyvalent allyl or an oligomer or polymer containing a crosslinkable functional group.

25. An electromagnetophoretic display which comprises one top layer of display cells and one bottom layer comprising display cells which are filled with an electromagnetophoretic fluid comprising a mixture of black magnetic particles and white non-magnetic particles dispersed in a colorless clear solvent or solvent.

26. The display of claim 25 wherein the top layer comprises red, green and blue cells which are filled with electrophoretic fluids comprising white particles dispersed in red, green and blue solvent or solvent mixture, respectively.

27. The display of claim 25 wherein the top layer comprises display cells which are filled with an electrophoretic fluid comprising a mixture of white and black particles dispersed in a colorless clear solvent or solvent mixture.

28. A process for the manufacture of an electrophoretic display of more than one layer of display cells, which process comprises:
 a) preparing separately two layers of display cells, each having a conductor film side and a sealing side; and
 b) laminating one of the layers over the other optionally with an adhesive layer.

29. The process of claim 28 wherein step (a) is carried out by forming display cells over a conductor film, filling said cells with an electrophoretic fluid and sealing the filled cells with a polymeric sealing layer.

30. The process of claim 29 wherein said cells are prepared by microembossing.

31. The process of claim 29 wherein said cells are prepared by photolithography or pre-punched holes.

32. The process of claim 29 wherein said cells of the two layers are prepared by different methods.

33. The process of claim 32 wherein said methods are independently microembossing, photolithography or pre-punched holes.

34. The process of claim 28 wherein step (b) is carried out by laminating one layer of the display cells over the other layer with the sealing sides of the two layers facing each other.

35. A process for the preparation of an electrophoretic display of more than one layer of display cells, which process comprises:
 a) forming a first layer of display cells, said first layer having a conductor film side and a sealing side;
 b) forming a second layer of display cells on a transfer release layer, said second layer having a transfer release layer side and a sealing side;
 c) laminating said second layer over said first layer and removing said transfer release layer;
 d) optionally forming separately additional layers of display cells on transfer release layers; each layer having a transfer release layer side and a sealing side;
 e) laminating each of said additional layers over a stack of layers already formed and removing the transfer release layer; and
 f) laminating a second conductor film over said stack.

36. The process of claim 35 wherein step (a) is carried out by forming display cells on a conductor film, filling said cells with an electrophoretic fluid and sealing the filled cells with a polymeric sealing layer.

37. The process of claim 36 wherein said cells are prepared by microembossing.

38. The process of claim 36 wherein said cells are prepared by photolithography or pre-punched holes.

39. The process of claim 35 wherein steps (b) and (d) are carried out by forming display cells on said transfer release layer, filling said cells with an electrophoretic fluid and sealing the filled cells with a polymeric sealing layer.

40. The process of claim 39 wherein said cells are prepared by microembossing.

41. The process of claim 39 wherein said cells are prepared by photolithography or pre-punched holes.

42. The process of claim 35 wherein the layers of display cells are prepared by different methods.

43. The process of claim 42 wherein said methods are independently microembossing, photolithography or pre-punched holes.

44. The process of claim 35 wherein step (c) is carried out by laminating said second layer over said first layer with the sealing sides of the two layers facing each other, followed by removing said transfer release layer.

45. The process of claim 35 wherein step (e) is carried out by laminating said additional layer over a stack of layers already formed, with the sealing side of the additional layer facing the stack, followed by removing said transfer release layer.

46. The process of claim 35 wherein step (f) is carried out by lamination with or without an adhesive layer.

* * * * *

UNITED STATES PATENT AND TRADEMARK OFFICE
CERTIFICATE OF CORRECTION

| | | |
|---|---|---|
| PATENT NO. | : 7,072,095 B2 | Page 1 of 1 |
| APPLICATION NO. | : 10/696805 | |
| DATED | : July 4, 2006 | |
| INVENTOR(S) | : Rong-Chang Liang et al. | |

It is certified that error appears in the above-identified patent and that said Letters Patent is hereby corrected as shown below:

Claim 2, Column 17, lines 66-67, delete "filled display cells are sealed with a polymeric sealing layer", and insert -- display cells are separated by partition walls --.

Signed and Sealed this

Eighth Day of July, 2008

JON W. DUDAS
*Director of the United States Patent and Trademark Office*